(12) United States Patent
Castinado et al.

(10) Patent No.: US 11,128,575 B2
(45) Date of Patent: Sep. 21, 2021

(54) SYSTEM FOR INCREASING PROCESSING EFFICIENCY THROUGH AUTOMATED RESOURCE FIELD TRANSFORMATION

(71) Applicant: BANK OF AMERICA CORPORATION, Charlotte, NC (US)

(72) Inventors: Joseph Benjamin Castinado, North Glenn, CO (US); Charles Russell Kendall, Snoqualmie, WA (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 49 days.

(21) Appl. No.: 16/041,181

(22) Filed: Jul. 20, 2018

(65) Prior Publication Data

US 2020/0028797 A1 Jan. 23, 2020

(51) Int. Cl.
| | |
|---|---|
| *H04L 12/911* | (2013.01) |
| *G06F 9/54* | (2006.01) |
| *H04L 29/08* | (2006.01) |
| *G06F 16/245* | (2019.01) |
| *G06F 16/25* | (2019.01) |

(52) U.S. Cl.
CPC .............. *H04L 47/82* (2013.01); *G06F 9/542* (2013.01); *G06F 16/245* (2019.01); *G06F 16/258* (2019.01); *H04L 67/10* (2013.01)

(58) Field of Classification Search
CPC ....... H04L 47/82; H04L 67/10; G06F 16/245; G06F 16/248; G06F 9/542
See application file for complete search history.

(56) References Cited

U.S. PATENT DOCUMENTS

| | | |
|---|---|---|
| 5,748,892 A | 5/1998 | Richardson |
| 5,878,220 A | 3/1999 | Olkin et al. |
| 6,687,758 B2 | 2/2004 | Craft et al. |
| 7,263,103 B2 | 8/2007 | Kagan et al. |
| 7,633,955 B1 | 12/2009 | Saraiya et al. |
| 7,818,362 B2 | 10/2010 | Boyd et al. |
| 8,316,109 B2 | 11/2012 | Freimuth et al. |
| 8,713,180 B2 | 4/2014 | Bakke et al. |

(Continued)

*Primary Examiner* — Ninos Donabed
*Assistant Examiner* — Raqiul A Choudhury
(74) *Attorney, Agent, or Firm* — Michael A. Springs; Moore & Van Allen PLLC; Nicholas C. Russell

(57) ABSTRACT

Embodiments of the present invention provide a system for increasing processing efficiency through automated resource field transformation. A message with multiple resource fields is received, and a first resource field is identified as being populated with a burdensome resource element. The burdensome resource element is extracted from the first resource field, creating a slim version of the message that is processed through normal procedures to execute an associated event. The burdensome resource element is routed to a burdensome resource processing system. The burdensome resource processing system can store the burdensome resource element until the burdensome resource element is requested by a user, and then transfer the burdensome resource element to the user after specialized processing of the element. Alternatively, the burdensome resource processing system may be a specialized processing system that processes the burdensome resource element's type more efficiently than the general processing procedures used to process the slim message.

15 Claims, 7 Drawing Sheets

(56) References Cited

U.S. PATENT DOCUMENTS

| | | | |
|---|---|---|---|
| 8,948,199 B2 | 2/2015 | Kagan et al. | |
| 9,219,683 B2 | 12/2015 | Zur et al. | |
| 9,276,993 B2 | 3/2016 | Keels et al. | |
| 9,385,874 B2 | 7/2016 | Bestler et al. | |
| 9,479,587 B2 | 10/2016 | Bestler et al. | |
| 9,699,260 B2 | 7/2017 | Walkin et al. | |
| 9,965,441 B2 | 5/2018 | Sajeepa et al. | |
| 10,013,390 B2 | 7/2018 | Huang et al. | |
| 10,021,223 B2 | 7/2018 | Pope et al. | |
| 10,333,843 B2 | 6/2019 | Jha et al. | |
| 10,445,156 B2 | 10/2019 | Pope et al. | |
| 2003/0188015 A1* | 10/2003 | Lee | H04L 69/16 709/238 |
| 2009/0325609 A1* | 12/2009 | Rosen | H04L 51/36 455/466 |
| 2013/0007180 A1* | 1/2013 | Talpey | H04L 47/39 709/212 |
| 2014/0337074 A1* | 11/2014 | Taylor | G06Q 30/018 705/7.13 |
| 2015/0381549 A1* | 12/2015 | Word | H04L 67/42 709/203 |
| 2016/0191564 A1* | 6/2016 | Liu | H04L 63/1458 726/11 |
| 2016/0267150 A1* | 9/2016 | Gubau i Forne | G06Q 30/018 |
| 2017/0171214 A1* | 6/2017 | Anderson | H04L 63/104 |
| 2017/0339001 A1* | 11/2017 | Wang | H04L 29/08693 |
| 2019/0028369 A1* | 1/2019 | Wiener | H04L 41/0853 |
| 2019/0149316 A1* | 5/2019 | Pala | H04L 67/34 713/156 |

* cited by examiner

SYSTEM FOR INCREASING PROCESSING EFFICIENCY THROUGH AUTOMATED RESOURCE FIELD TRANSFORMATION

BACKGROUND

The use of electronic data interchange of resources for the execution of certain events and the communication of associated information enables processing systems to quickly and efficiently process the interchanged electronic data, but only when such electronic data is embodied in strictly formatted messages. As electronic data interchange systems develop to permit more complex formatting schemes, and to permit the interchange of non-traditional data formats, resources that are large in size, and other resources that cannot be processed in an efficient manner by the traditional or general processing systems (together referred to as "burdensome resources"), an improved system is needed to maintain or increase processing efficiency through automated resource field transformation (including bifurcating these burdensome resources from a message and processing the burdensome resources separately from the remainder of the message.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for increasing processing efficiency through automated resource field transformation. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve receiving a message comprising a plurality of resource fields, wherein the message is associated with a message reference code. Once the message has been received, the system may identify a first resource field of the plurality of resource fields that comprises a burdensome resource element. The system may then extract the burdensome resource element from the first resource field of the message to generate a slim message and route the extracted burdensome resource element to a burdensome resource processing system. The system can then process the slim message to execute an event associated with the message.

In some embodiments of the system, routing the extracted burdensome resource element to the burdensome resource processing system comprises storing the burdensome resource element in a relational database that associates the burdensome resource element with the message reference code or a burdensome resource reference code. In such embodiments, the system may receive, from a computing device of a user associated with the message, a request for the burdensome resource element, wherein the request comprises the message reference code or the burdensome resource reference code. The system can then query the relational database with the message reference code or the burdensome resource reference code to identify the burdensome resource element within the relational database. Next, the system may copy the burdensome resource element from the relational database and then transmit the burdensome resource element to the computing device of the user.

In some embodiments of the system, the step of copying the burdensome resource element from the relational database comprises extracting the burdensome resource element from the relational database and populating the first resource field of the processed slim message with the burdensome resource element. In such embodiments of the system, transmitting the burdensome resource element to the computing device of the user comprises transmitting the processed slim message, comprising the burdensome resource element populated in the first resource field of the processed slim message, to the computing device of the user.

In other embodiments of the system, the step of copying the burdensome resource element from the relational database comprises extracting the burdensome resource element from the relational database and associating the burdensome resource element with a parameter of the first resource field. In some such embodiments, transmitting the burdensome resource element to the computing device of the user comprises transmitting the parameter of the first resource field and the burdensome resource element to the computing device of the user.

The burdensome resource processing system referenced above may, in some embodiments, comprise a specialized processing system configured to efficiently process resource elements of the same resource type as the burdensome resource element.

In some embodiments of the system, identifying the first resource field comprises determining that the burdensome resource element of the first resource field meets a predetermined resource size threshold. Additionally or alternatively, identifying the first resource field comprises determining that the burdensome resource element of the first resource field meets a predetermined resource format type. Furthermore, the step of identifying the first resource field may comprise determining that the burdensome resource element of the first resource field meets a predetermined resource size threshold for a specific resource format type that is associated with the burdensome resource element.

The system may, in some embodiments, identify the first resource field by identifying a message template associated with the received message, and determining a position of a field of the message template that is associated with large resource sizes. The system may then identify the first resource field in the received message based on the position of the field of the message template that is associated with large resource sizes.

In some embodiments of the system, extracting the burdensome resource element from the resource field comprises leaving the first resource field empty.

Finally, in response to extracting the burdensome resource element from the first resource field, the system may populate the first resource field with a burdensome resource reference code.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
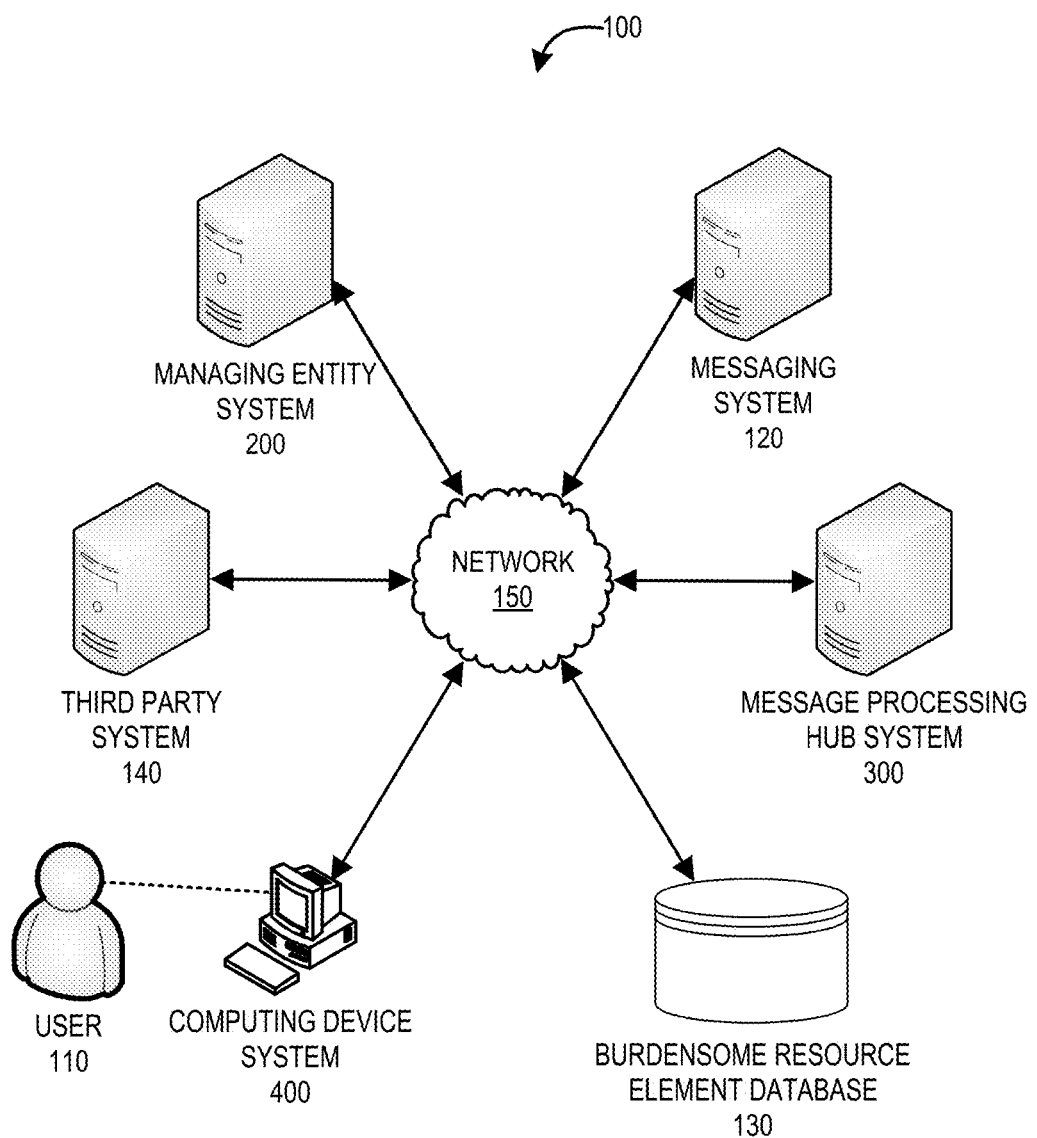
Figure 2:
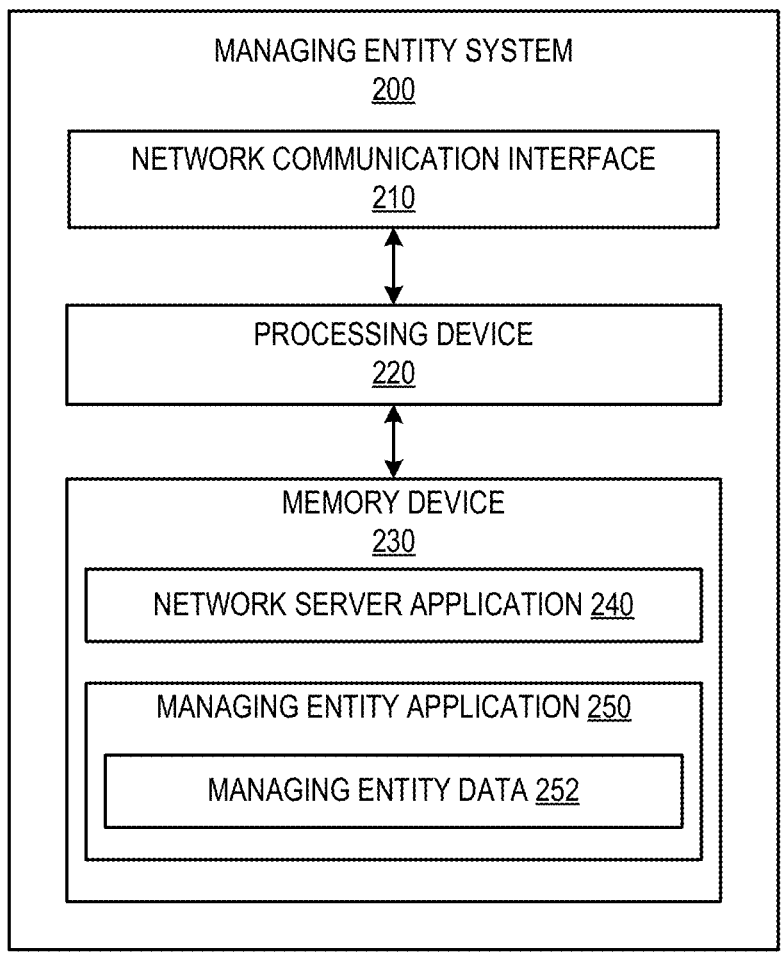
Figure 3:
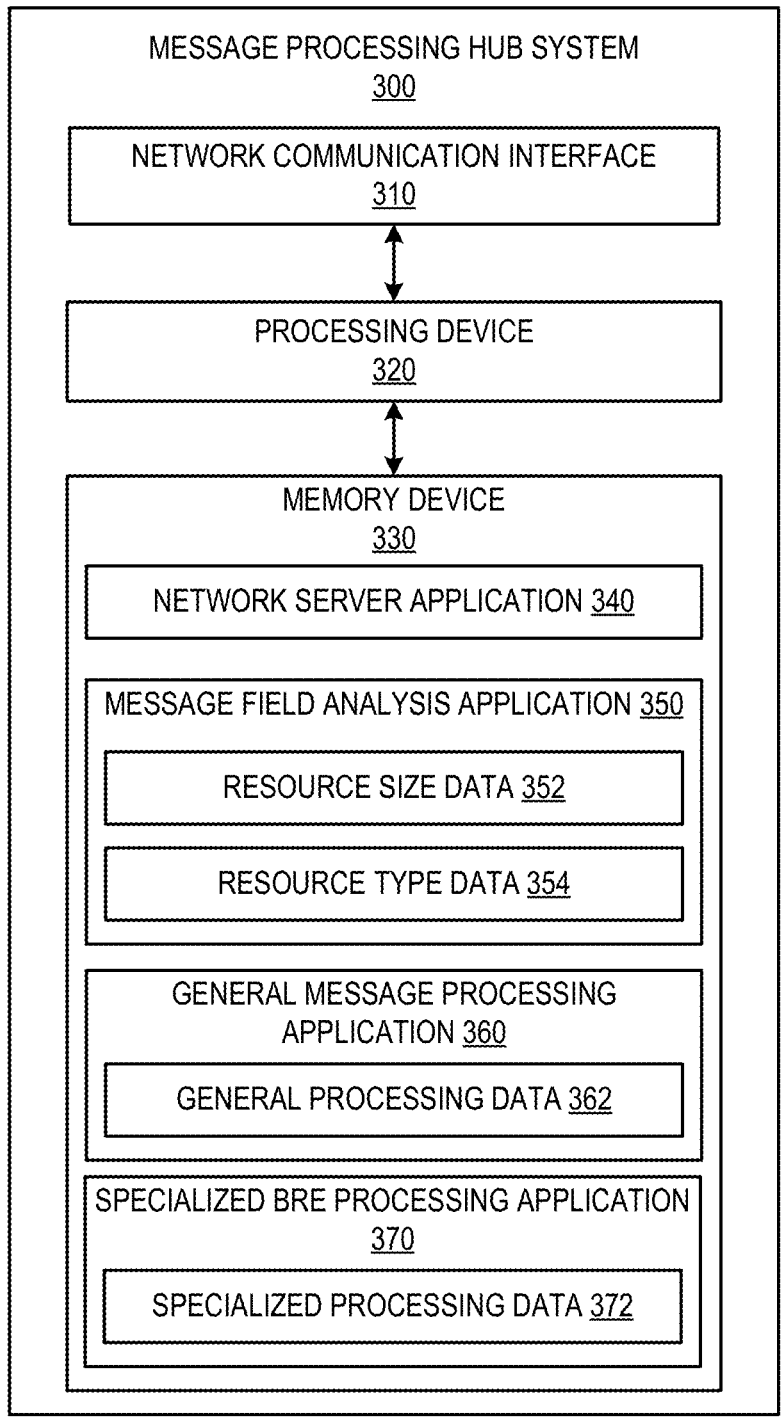
Figure 4:
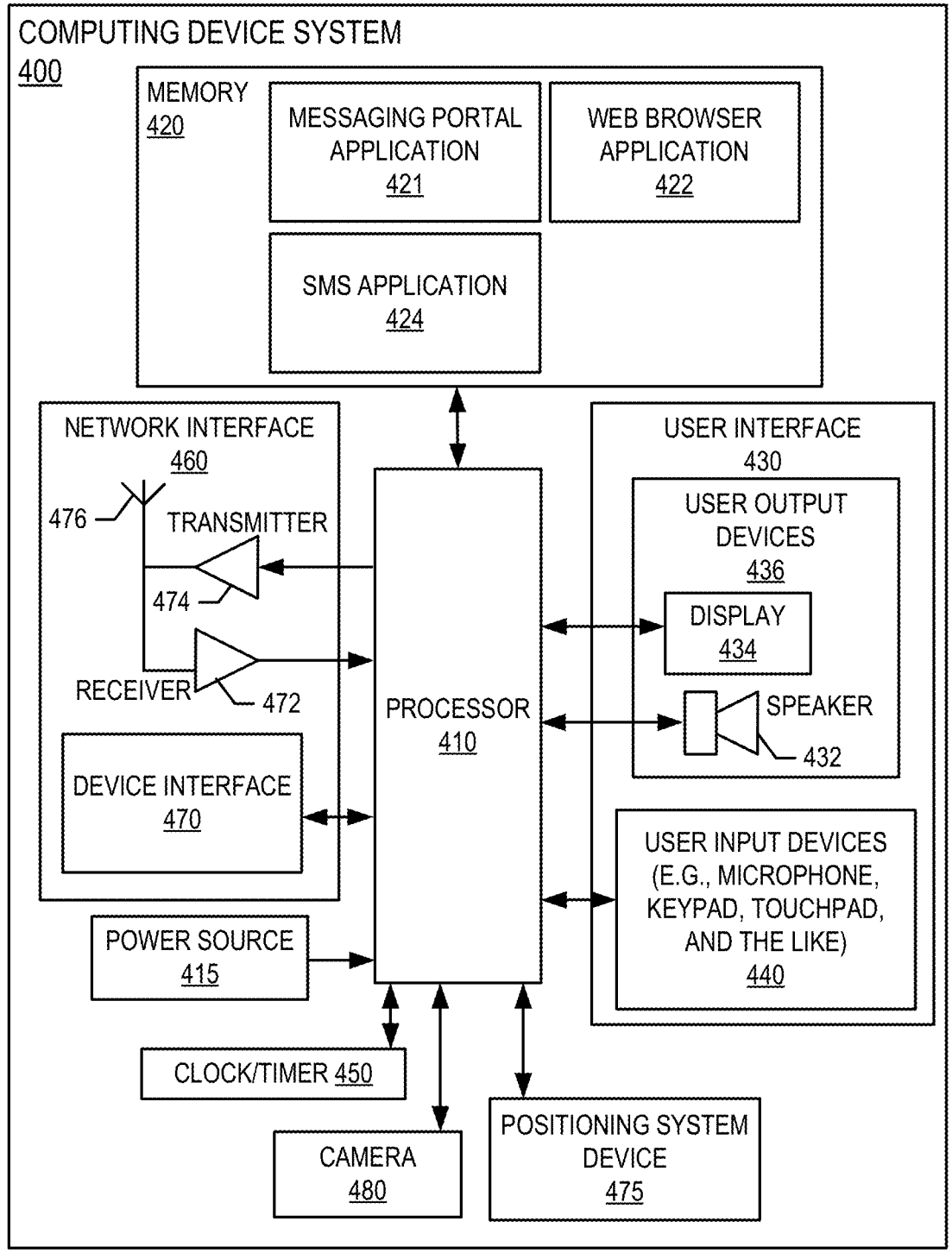
Figure 5:
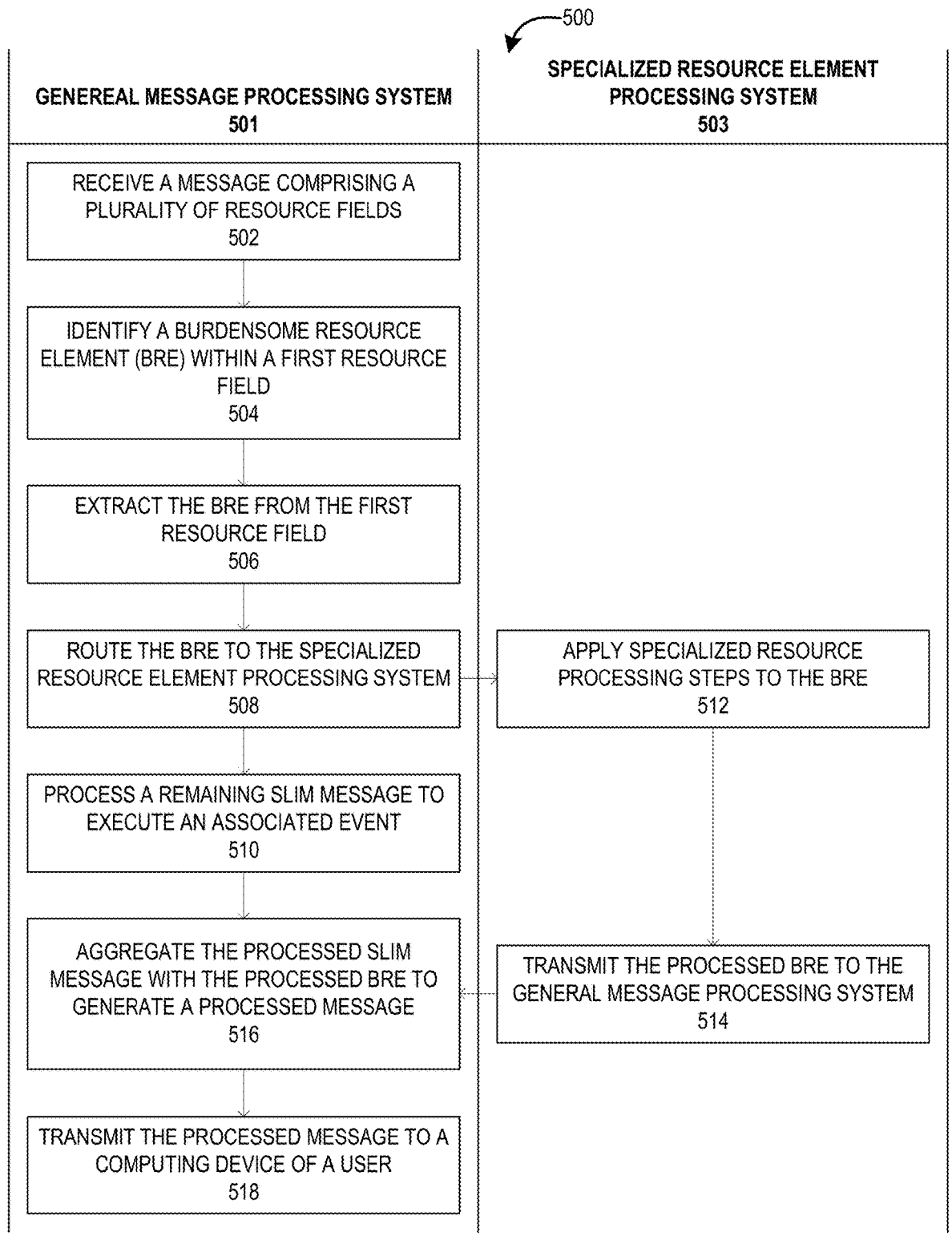
Figure 6:
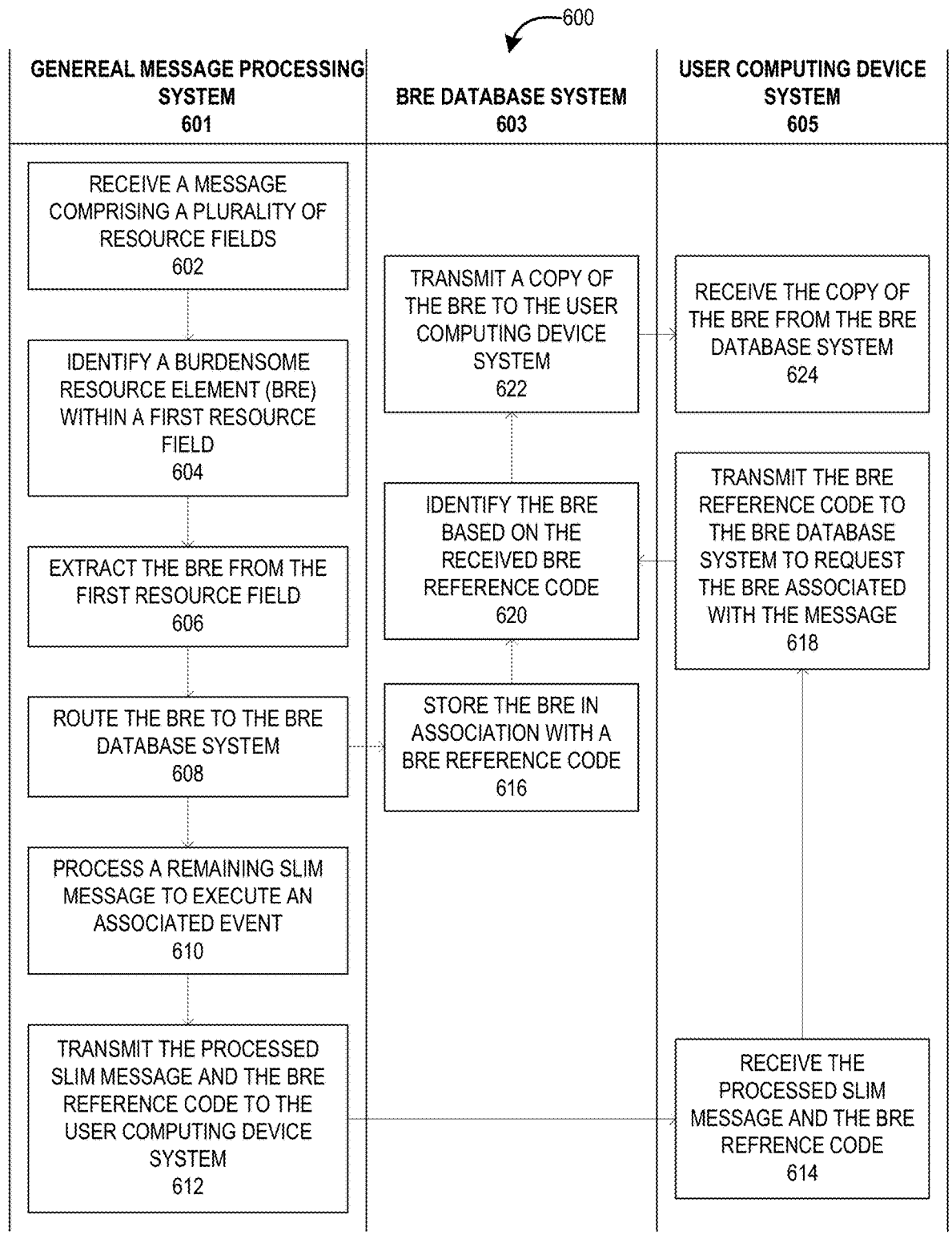
Figure 7:
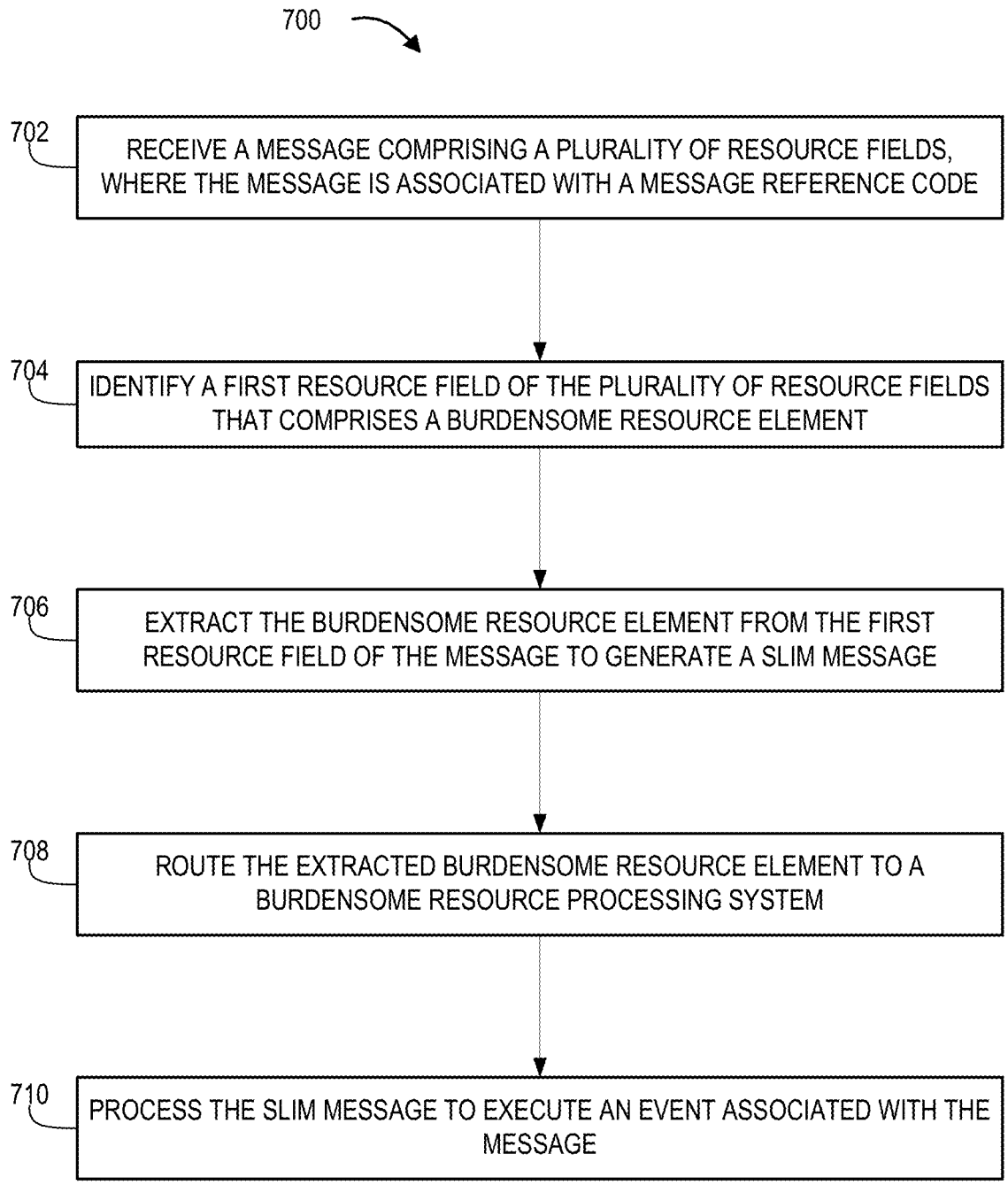

Having thus described embodiments of the invention in general terms, reference will now be made the accompanying drawings, wherein:

FIG. 1 provides a block diagram illustrating a system environment for increasing processing efficiency through automated resource field transformation, in accordance with an embodiment of the invention;

FIG. 2 provides a block diagram illustrating the managing entity system of FIG. 1, in accordance with an embodiment of the invention;

FIG. 3 provides a block diagram illustrating the message processing hub system of FIG. 1, in accordance with an embodiment of the invention;

FIG. 4 provides a block diagram illustrating the computing device system of FIG. 1, in accordance with an embodiment of the invention;

FIG. 5 provides flowchart illustrating a process for increasing processing efficiency through automated resource field transformation using bifurcated and specialized processing systems, in accordance with an embodiment of the invention;

FIG. 6 provides a flowchart illustrating a process for increasing processing efficiency through automated resource field transformation using a relational database system accessible by a user computing device system, in accordance with embodiments of the invention; and FIG. 7 provides a flowchart illustrating a process for increasing processing efficiency through automated resource field transformation, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein the term "message" refers to an electronic data interchange that comprises multiple message fields (which may be referred to as resource fields) or the like, where each field includes information, data, documents, files, images, multimedia, or the like that are generally associated with a transaction. The message can be processed by a message processing device that processes each resource field of the message to identify information about a transaction that are related to the execution of the transaction. For example, a message field may include an account number from which to debit an amount of funds, an account number to credit the amount of funds, a transaction description field that provides a title or general description for the transaction, and the like. The message may also include one or more resource fields that are populated with very large data elements, data elements of obscure or non-traditional formats, or other information that is otherwise burdensome to process with the rest of the message or resource fields, but which does provide additional or supplemental information or content that is associated with the transaction.

As used herein, the term "burdensome resource element" ("BRE") refers to a large data file, a data file of a data type that is difficult for a normal messaging system to process, a non-traditional data element or data type for inclusion in a messaging field associated with executing a transaction, or any other data, information, document, folder, or the like that requires significant processing time and resources that are substantially more than the other resource elements of an associated message that are necessary or required for the processing of an associated transaction.

Embodiments of the present invention provide a system and method for efficiently processing messages that include events (e.g., financial transactions) that are executed upon processing of the messages, by identifying, extracting, and separately processing or transmitting certain resource elements of the message that would otherwise be burdensome to the general message processing system.

FIG. 1 provides a block diagram illustrating a system environment 100 for increasing processing efficiency through automated resource field transformation, in accordance with an embodiment of the invention. As illustrated in FIG. 1, the system environment 100 includes a managing entity system 200, a messaging system 120, a message processing hub system 300, a burdensome resource element database 130, a computing device system 400, and one or more third party systems 140. One or more users 110 may be included in the system environment 100. In some embodiments, the user(s) 110 of the system environment 100 may be recipients of messages being sent through the messaging system 120 and processed via the message processing hub system 300. These users 110 may be employees of, contractors for, customers of, or otherwise affiliated with the managing entity that controls the managing entity system 200 and/or one or more other systems of the system environment 100.

The managing entity system 200, the messaging system 120, the message processing hub system 300, the burdensome resource element database 130, the computing device system 400, and/or the third party system 140 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

The managing entity system 200 may be a system owned or otherwise controlled by a managing entity to perform one or more process steps described herein. In some embodiments, the managing entity is a financial institution. In general, the managing entity system 200 is configured to communicate information or instructions with the messaging system 120, the message processing hub system 300, the burdensome resource element database 130, the computing device system 400, and/or the third party system 140 across the network 150. The managing entity system 200 may control each of these other systems or transmit instructions to the other systems within the system environment 100 to cause each individual system to communicate with each other and work together to perform one or more of the processing steps described herein. As such, at least a portion of the messaging system 120, at least a portion of the message processing hub system 300, at least a portion of the burdensome resource element database 130, and at least a portion of the computing device system 400 may be a component of the managing entity system 200.

The managing entity that owns, manages, or otherwise controls the managing entity system 200 may be any entity that specializes in processing messages, especially messages that include multiple resource fields that contain transaction information and additional information or resources (including large files or other burdensome resources) that, when processed, cause a transaction to be executed. As such, the managing entity may comprise a financial institution, a transaction clearing house institution, a communications provider, an Internet service provider, or the like.

The managing entity system 200 may be configured to perform any or all of the steps described herein, including those process steps described with respect to FIG. 5, FIG. 6, and/or FIG. 7. The managing entity system 200 is described in more detail with respect to FIG. 2.

The messaging system 120 may be a system owned or controlled by the managing entity, a clearing house entity or institution, a consortium of financial institutions (e.g., including the managing entity), or any other party that specializes in electronic data interchange, particularly for the interchange of messages that include transaction information and/or additional files, data, or other information that comprise large files or non-conventional data formats. In some embodiments, the messaging system 120 may comprise a real-time payment system.

The message processing hub system 300 may be a system owned or controlled by the managing entity, a clearing house institution, and/or any third party that specializes in identifying burdensome resources from resource fields of messages, extracting the burdensome resources from the messages, and routing the burdensome resources to a specialized processing system that is more efficient than the general message processing system (e.g., the messaging system 120) that will be processing the remainder of the message (i.e., a "slim" message). As such, the message processing hub system 300 may be an integral component of the messaging system 120. Alternatively, the message processing hub system 300 may be an ancillary component of the messaging system 120 that is configured to intake new messages and bifurcate burdensome resource elements from the remaining slim message for separate processing within the messaging system, or to be used as an external system to which the messaging system 120 can route or otherwise direct messages that may contain burdensome resource elements, and have at least the slim message returned once the message processing hub system 300 extracts the burdensome resource element.

In general, the message processing hub system 300 is configured to communicate information or instructions with the managing entity system 200, the messaging system 120, the burdensome resource element database 130, the computing device system 400, and/or the third party system 140 across the network 150. For example, the message processing hub system 300 may be configured to receive messages comprising pluralities of resource fields from the messaging system 120 and/or the managing entity system 200. The message processing hub system 300 may further be configured to transmit extracted burdensome resource elements identified in the received messages to the burdensome resource element database 130, the managing entity system 200, the messaging system 120, and/or the computing device system 400. Furthermore, the message processing hub system 300 may be configured to receive requests for burdensome resource elements from the computing device system 400 associated with the user 110, to access and identify the burdensome resource element from the burdensome resource element database 130, and to transmit the burdensome resource element back to the computing device system 400 of the user 110. Of course, the message processing hub system 300 may be configured to perform (or instruct other systems to perform) one or more other process steps described herein. The message processing hub system 300 is described in more detail with respect to FIG. 3.

The burdensome resource element database 130 may comprise a database (e.g., a relational database, a blockchain network that includes distributed ledgers, a data lake, or the like) that is configured to store large data files or otherwise burdensome resources. The burdensome resource element database 130 may be integrated with, or be a component of, the message processing hub system 300, or may be an ancillary system that can be accessed by the message processing hub system 300 and/or the computing device system 400. In some embodiments, the burdensome resource element database 130 is configured to store burdensome resource elements identified and stored by the message processing hub system 300 until processing stresses of the messaging system 120, the managing entity system 200, and/or the message processing hub system 300 are reduced below a predetermined threshold amount, at which point the burdensome resource element database 130 automatically transmits the burdensome resource elements to the messaging system 120, the message processing hub system 300, and/or the managing entity system 200. In other embodiments, the burdensome resource element database 130 is configured to store the burdensome resource elements in association with (e.g., linked with, tagged with, or otherwise made searchable based on an input of) a message reference code, a transaction identification code, a burdensome resource reference code, and/or the like.

The computing device system 400 may be a system owned or controlled by the managing entity and/or a third party that specializes in providing computing devices to users (e.g., the user 110), and may be a specialized computing device system 400 configured to provide a direct link to the burdensome resource element database 130, the managing entity system 200, the messaging system 120, and/or the message processing hub system 300. In general, the computing device system 400 is configured to communicate information or instructions with the managing entity system 200, the messaging system 120, the message processing hub system 300, the burdensome resource element database 130, and/or the third party system 140 across the network 150.

For example, the computing device system 400 may be configured to provide a user interface for a messaging portal to the user 110, receive user input from the user 110, and transmit requests for burdensome resource elements to the burdensome resource element database 130, the messaging system 120, and/or the message processing hub system 300. The computing device system 400 may further be configured to receive updated messages (e.g., slim messages comprising an inputted, processed burdensome resource element), and/or receive stand-alone transmissions of the burdensome resource elements. Of course, the computing device system 400 may be configured to perform (or instruct other systems to perform) one or more other process steps described herein. The computing device system 400 is described in more detail with respect to FIG. 4.

The third party system 140 may be any system that provides additional or supplemental steps, data, information, or the like to the other systems of the system environment 100. For example, a third party system 140 may comprise a merchant system at which the user 110 has made a purchase, where the financial transaction for that purchase is being made through the messaging system 120 (e.g., from a financial account of the user 110, to the financial institution of the user 110, to a clearing house system, to the financial institution of the merchant system, to the financial account of the merchant system). As such, additional information about the purchase including, but not limited to, digital receipts, images of the product, security images associated with individuals present at the physical transaction, instruction videos associated with the product, warranty documentation for the product, or the like may be included in the message associated with that transaction, where this additional information is not required for the transaction to be processed, but is useful, helpful, or necessary to be transmitted as part of the message for recordation purposes, informative purposes, and the like.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

The network communication interface 210 is a communication interface having one or more communication devices configured to communicate with one or more other devices on the network 150, such as the messaging system 120, the message processing hub system 300, the burdensome resource element database 130, the computing device system 400, and/or the third party system 140. The processing device 320 is configured to use the network communication interface 310 to transmit and/or receive data and/or commands to and/or from the other devices connected to the network 150.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, a managing entity application 250 which includes managing entity data 252. The computer-executable program code of the network server application 240 and/or the managing entity application 250 may instruct the processing device 220 to perform certain logic, data-processing, and data-storing functions of the managing entity system 200 described herein, as well as communication functions of the managing entity system 200.

In particular, the managing entity application 250, using the managing entity data 252, may be configured to perform, or otherwise instruct other devices or systems to perform, one or more of the process steps described below with respect to FIG. 5, FIG. 6, and FIG. 7.

FIG. 3 provides a block diagram illustrating the message processing hub system 300, in greater detail, in accordance with embodiments of the invention. As illustrated in FIG. 3, in one embodiment of the invention, the message processing hub system 300 includes one or more processing devices 320 operatively coupled to a network communication interface 310 and a memory device 330. In certain embodiments, the message processing hub system 300 is operated by a first entity, such as a financial institution, while in other embodiments, the message processing hub system 300 is operated by an entity other than a financial institution.

It should be understood that the memory device 330 may include one or more databases or other data structures/repositories. The memory device 330 also includes computer-executable program code that instructs the processing device 320 to operate the network communication interface 310 to perform certain communication functions of the message processing hub system 300 described herein. For example, in one embodiment of the message processing hub system 300, the memory device 330 includes, but is not limited to, a network server application 340, a message field analysis application 350 which includes resource size data 352 and resource type data 354, a general message processing application 360 which includes general processing data 362, a specialized burdensome resource element ("BRE") processing application 370 which includes specialized processing data 372, and other computer-executable instructions or other data. The computer-executable program code of the network server application 340, the message field analysis application 350, the general message processing application 360, and/or the specialized burdensome resource element processing application 370 may instruct the processing device 320 to perform certain logic, data-processing, and data-storing functions of the message processing hub system 300 described herein, as well as communication functions of the message processing hub system 300.

In one embodiment, the message field analysis application 350 includes resource size data 352 and resource type data 354. The resource size data 352 may comprise information regarding threshold data sizes (e.g., predetermined threshold data size amounts) that can be referenced by the message field analysis application 350 to identify a resource element of a messaging field that is considered burdensome for general messaging procedures. The resource type data 354 may comprise information regarding particular types of resources (e.g., data types, data format types, encrypted data identifiers, and the like) that can be referenced by the message field analysis application 350 to identify a resource element of a messaging field that is considered burdensome for general messaging procedures. The resource size data 352 and the resource type data 354 may include message template information for one or more known or approved message templates that the message processing hub system 300 expects to receive and process, such that each message or reference field of the template is known to be associated with resources of a particular size and/or type. In this way, the message field analysis application 350 may be configured to identify burdensome resource elements in newly received messages based on the presence of resources in resource fields that the associated message template indicates represents a burdensome resource for general processing purposes.

In one embodiment, the general message processing application 360 includes general processing data 362. This general processing data 362 may include information for identifying parameters (e.g., account numbers, transaction amounts, parties to the transaction, time-stamp information for the transaction, and the like) of a transaction or other event associated with a message, as well as for how to process these transaction parameters. As such, the general message processing application 360 may automatically process slim versions of the messages, in direct response to one or more burdensome resource elements being extracted from the message. However, the general message processing application 360 is not specifically configured to efficiently process additional information, particularly bulky information or non-traditional transaction information like multimedia files, large warranty or other agreement documents, and the like, in an efficient manner similar to the traditional transaction data and information.

As such, the message processing hub system 300 may include the specialized burdensome resource element processing application 370 that includes specialized processing data 372 that is particularly configured to process or manage burdensome resource elements extracted from received messages in a more-efficient manner than the general message processing application 360. For example, the specialized burdensome resource element processing application 370 may be configured to use its specialized processing data 372 to identify a data type of a burdensome resource element, to identify a processing technique that is known to be an efficient manner to process the burdensome resource element (or at least more efficient than automatically sending the burdensome resource element to the general message processing application), and to process that burdensome resource element in the more efficient manner.

As noted throughout, processing the burdensome resource element in an efficient manner may comprise storing the burdensome resource element in a database and monitoring the processing load of the general message processing application 360, and then processing the burdensome resource element separately from the rest of the message at a point in time when the processing load of the general message processing application 360 is below a predetermined threshold value that is associated with minimal or no delays in the processing of other transaction information.

Alternatively, processing the burdensome resource element in an efficient manner may comprise identifying a processing technique of the specialized processing application 370 that is particularly configured to more efficiently process the burdensome resource element than the general message processing application 360. For example, if the burdensome resource element comprises an image file, an image processing application may be utilized to process the image, where the image processing application does not perform one or more transaction processing steps that would have been performed on the message under the general message processing application 360 that is configured for general transaction processing of messages.

In other embodiments, processing the burdensome resource element in an efficient manner may comprise storing the burdensome resource element in a relational database, and only processing the burdensome resource element in the event that a user (e.g., the user 110) requests the burdensome resource element. In such embodiments, in response to receiving a request of the user (e.g., the user 110) that includes a message and/or burdensome resource element reference code, the specialized burdensome resource element processing application 370 may identify the burdensome resource element by querying the relational database for the message and/or burdensome resource reference code, process the burdensome resource element through general or specialized process steps, and transmit the processed burdensome resource element to a computing device of the user (e.g., the user 110).

FIG. 4 provides a block diagram illustrating a computing device system 400 of FIG. 1 in more detail, in accordance with embodiments of the invention. In some embodiments of the invention, the computing device system 400 is a personal computer, a desktop computer, a workstation, a mobile telephone, a tablet computer, or the like. However, it should be understood that these are merely illustrative of several types of computing device systems 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, gaming devices, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of a wireless network. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 434 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422 and/or a messaging portal application 421 (or any other application provided by the managing entity system 200). These applications also typically instructions to a graphical user interface (GUI) on the display 434 that allows the user 110 to interact with the computing device system 400, the managing entity system 200, and/or other devices or systems. In one embodiment of the invention, when the user 110 decides to enroll in a messaging portal application 421 program, the user 110 downloads, is assigned, or otherwise obtains the messaging portal application 421 from the managing entity system 200, or from a distinct application server (e.g., from the messaging system 120 and/or the message processing hub system 300). In other embodiments of the invention, the user 110 interacts with the managing entity system 200, the messaging system 120, the message processing hub system 300, or a third party system 140 via the web browser application 422 in addition to, or instead of, the messaging portal application 421.

The memory 420 of the computing device system 400 may comprise a Short Message Service (SMS) application 423 configured to send, receive, and store data, information, communications, alerts, and the like via a wireless telephone network.

The messaging portal application 421 may be specifically configured to display the message, or information associated with the message, including transaction execution confirmations, transaction information, a message reference code, a burdensome resource reference code, and the like. The messaging portal application 421 may additionally provide, via the user interface 430, an indication that a burdensome resource element associated with a received message is available for the user 110, upon a request from the user 110. As such, the user may request access to the additional or burdensome resource element via the messaging portal application 421. This request may include the message reference code (e.g., a transaction ID), and/or a reference code for the specific burdensome resource element (e.g., a reference code that is included in the place of the burdensome resource element within the message field of the slim message received by the user).

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart that illustrates a process 500 for increasing processing efficiency through automated resource field transformation using bifurcated and specialized processing systems, in accordance with an embodiment of the invention. In general, the process 500 is configured to process received messages (e.g., electronic data interchange of financial transactions, business documents, and the like) in a more efficient manner than traditional or general message processing systems alone. The systems that perform one or more of the steps of this process 500 may include a general message processing system 501 and a specialized resource element processing system 503. In some embodiments, the general message processing system 501 includes or comprises at least a portion of an intelligent resource processing hub (e.g., an intelligent payment hub, an intelligent event bus, an intelligent payment router, an intelligence resource element router, or the like).

The process 500 may be performed by a general message processing system 501 and/or a specialized resource element processing system 503. To begin, the general message processing system 501 may receive a message comprising a plurality of resource fields, as shown at block 502. The message may be in the form of any electronic data interchange, and may adhere to the International Organization for Standardization ("ISO") 20022 standard for electronic data interchange between financial institutions. As such, the resource fields (e.g., data fields, information fields, text fields, metadata fields, document attachment fields, document reference fields, and the like) of the message may include, comprise, or be configured to be populated with and transfer payment transaction information, settlement information, credit card transaction information, debit card transaction information, and other financial information. In some embodiments, the metadata associated with the resource fields of the message, and/or the message as a whole, may adhere to a special ISO 20022 Unified Modeling Language ("UML") standard.

Because the message may comprise an electronic data interchange framework like ISO 20022, the message may comprise a flexible framework that allows messaging parties to use common vocabulary, syntaxes, messaging models, Extensible Markup Language ("XML") schemas, Abstract Syntax Notation One ("ASN.1") schemas, and other messaging models that can accommodate the population and transfer of any resource type and any resource size through the a messaging network.

The general message processing system 501 may comprise a set of traditional message processing bots that are configured to translate the terms, codes, and other syntax within the message into language that the internal transaction execution, or other message processing systems are configured to read in order to execute an event (e.g., deposit a financial instrument, process a credit card transaction, transfer funds from one financial account to another, or the like) associated with the message.

In some embodiments, the received message may have a message reference code (e.g., an alphabetical code, a numeric code, an alpha-numeric code, a reference link that is associated with the message, a transaction identification code, or the like). In other embodiments, the general message processing system 501 assigns the message reference code to the message (and the resource elements that populate the resource fields of the message) upon receiving the message.

As noted above, each message may comprise a plurality of resource fields where data, information, documents, database links (e.g., references to particular database index positions), website links, intranet links, files, folders, multimedia files, or other resources (i.e., structured data elements, or "resource elements") may be populated. These resource fields of the message may include transaction information like account numbers (i.e., an account to be debited, an account to be credited), party identities (e.g., payor and payee), time-based information (e.g., a time that a transaction was agreed to have occurred, a time that a transaction should occur, or the like), and the like, such that an event like a financial transaction can automatically be executed when processed by a system like the general message processing system 501 of FIG. 5.

Importantly, one or more resource fields of the message may comprise or include additional information that is not required for the automatic execution of the event (e.g., the automatic execution of the financial transaction). For example, a resource field may include a resource element that comprises a text document or Portable Document Format ("PDF") document that sets forth warranty information for a product associated with a financial transaction that would be automatically executed with the message. To execute the financial transaction, the general message processing system 501 does not necessarily need to process the resource element of the text document or PDF document comprising warranty information that resides in this resource field, but that information likely is useful to the messaging parties for record keeping purposes or future interactions between the messaging parties.

The additional information that comprises resource elements that are included in one or more resource fields of the message may be any information that is related to the executed event, that supplements the executed event, that comprises a portion of the executed event (e.g., a video product that is associated with the event), or the like. A few examples of additional information include, but are not limited to, text or PDF documents comprising contracts associated with the event that will be executed through the processing of the message, terms and conditions associated with the event, audio or video files associated with the event, images associated with the event, electronic receipts or images of physical receipts associated with the event, and the like. As such, these additional information resource elements that have been populated in one or more resource field of a message may be large, heavy, or otherwise burdensome in size, or may comprise a non-traditional, rare, or otherwise difficult to process file type and therefore may be considered a burdensome resource element.

Next, as shown at block 504, the general message processing system 501 may identify a burdensome resource element ("BRE") within a first resource field of the message. As noted above, the resource fields may include resource elements that comprise documents, multimedia files, and the like that do not need to be processed by the general message processing system 501 for the associated event to be automatically executed. Furthermore, as noted above, some of the additional resource elements populated within the resource fields may be large, heavy, onerous, bulky, or otherwise burdensome in size, and therefore would require longer processing times than the smaller-sized resource elements (e.g., those resource elements that list just data or information of an account number or just a name associated with an account). The additional information may also include one or more resource elements that, while not necessarily heavy or bulky in resource size, may present significant processing burdens for the general message processing system 501 due to their non-traditional resource type (e.g., data type, file type, data format, document schema, or the like) that the general message processing system 501 is unable to process or that the general message processing system 501 is not specially configured to process in an efficient manner.

In some embodiments, the general message processing system 501 (or an associated intelligent message or payment processing hub system) may analyze each resource field of the message to determine or identify the sizes of resource elements populated within each resource field. The general message processing system 501 may then compare the resource sizes of each analyzed resource element to a predetermined resource size threshold, and identify resource elements that meet or exceed the resource size threshold as being burdensome resource elements.

Additionally or alternatively, the general message processing system 501 (or an associated intelligent message or payment processing hub system) may analyze each resource field of the message to determine or identify resource types (e.g., file types, data types, data format types, document format types, or the like) of the resource elements populated within each resource field. The general message processing system 501 may then compare the identified resource types of each analyzed resource element to a set of predetermined resource format types that have been deemed (e.g., by a managing entity) to be burdensome for the general message processing system 501. The general message processing system 501 may then identify those resource elements that match the format types of the predetermined burdensome resource format types as being burdensome resource elements themselves.

In some embodiments, the general message processing system 501 may utilize both resource type and resource size of the resource elements to identify a burdensome resource element of the message. For example, the system may compare an identified resource type and resource size for a single resource element of the message to a predetermined threshold resource size for the same resource type. In this way, the general message processing system 501 may still be permitted to process certain resource elements of a larger size when the resource type for that element can be easily processed by the general message processing system 501. Additionally, the general message processing system 501 can be configured to identify a different resource element as being a burdensome resource element, even though this different resource element has a smaller resource size than the first resource element, due to the different resource element being in the form of a resource type that the general message processing system 501 is not specially configured to process as efficiently as the resource type of the first resource element.

In other embodiments, the general message processing system 501 may be configured to identify a message template associated with the received message (e.g., based on an identification of one or more resource fields that either designate the message as having the particular message template, or being in a configuration that is strongly associated with the particular message template). The general message processing system 501 can then analyze information about the message template (e.g., information stored in a message template database that indicates resource types, typical resource sizes, and the like that are expected to be populated in each resource field of messages with the same resource template) to identify one or more resource fields of the message template that likely are associated with burdensome resource elements (e.g., large files, non-traditional resource types, difficult to efficiently process resource types, and the like). The general message processing system 501 can then identify the burdensome resource element(s) of the message by identifying the resource elements that are populated in the resource fields of the message that are associated with being burdensome by the identified message template. For example, the general message processing system 501 can identify all resource elements located at the same resource field positions as the template resource fields that are associated with housing burdensome resource elements.

Of course, any of these afore-mentioned techniques may be utilized by the general message processing system 501 to identify the burdensome resource element, either alone or in combination.

Once the burdensome resource element has been identified, the general message processing system 501 may then extract the burdensome resource element from the first resource field of the received message, as shown at block 506. Extracting the burdensome resource element from the first resource field of the message at least comprises stripping, removing, or obfuscating the burdensome resource element from the first resource field, such that the burdensome resource element will not subsequently be processed by the general message processing system 501 along with the remainder of the resource elements that populate the other resource fields of the message.

Therefore, extracting the burdensome resource element from the first resource field of the message may comprise removing the resource element from the first resource field and leaving the first resource field empty. Alternatively, the general message processing system may remove the burdensome resource element, but leave the metadata (or a reference to what the metadata comprised) of the burdensome resource element in the message. In some embodiments, the general message processing system 501 may, in response to removing the burdensome resource element form the first resource field, populate the first resource field with a reference code or link. For example, the reference code may comprise the message reference code for the overall message. Additionally or alternatively, the reference code may be a newly-generated reference code for the burdensome resource element (e.g., derived from the message reference code or randomly generated by the general message processing system 501). In other embodiments, the general message processing system 501 may populate the first reference field with a link that is associated with the burdensome resource element. This link may be subsequently associated with a database index position that allows a user to navigate a database to access a copy of the extracted burdensome resource element. The link may, in some embodiments, comprise a web page link, intranet page link, or the like, that allows a user to cause a computing device system to navigate to a web page or intranet page that is associated with the extracted burdensome resource element.

The general message processing system 501 may then proceed to block 508 to route the burdensome resource element to the specialized resource element processing system 503. By extracting the burdensome resource element from the message, and subsequently routing the burdensome resource element to the specialized resource element processing system 503, this process 500 provides a useful technique to break off heavy or otherwise burdensome data from their resource field, and bifurcate the burdensome data from non-burdensome data (i.e., resource elements that remain in the resource fields of the message) for separate processing, such that the resources are processed in a more efficient manner than by brute force through only the general message processing system 501.

Therefore, the general message processing system 501 (or an intelligent payment or message router) may be configured to automatically route a copy of the burdensome resource element to the specialized resource element processing system 503 via a secure communication channel that may be encrypted or otherwise protected. Once all burdensome resource elements have been stripped and routed to the specialized resource element processing system 503, the message, and its remaining resource elements, is considered a "slim" message that is ready to be more efficiently processed by the general message processing system 501 than in its "full" configuration (i.e., when initially received).

Once the burdensome resource element has been extracted and routed to the specialized resource element processing system 503, the general message processing system 501 may continue with processing the message by processing the remaining "slim" message to automatically execute an event associated with the message, as shown at block 510. The event associated with the message, as described above, may comprise a transaction or other transfer of funds or information between two parties (i.e., a message sender and a message receiver). With the burdensome resource element removed from the message (creating the slim version of the message), the general message processing system 501 can more efficiently process the message, due to the reduction in the amount of resource elements, the size of each individual resource element remaining in the message, and/or the removal of resource types that the general message processing system 501 is not efficient at processing.

Processing the slim message may comprise analyzing the resource elements within each resource field of the slim message for clearing house purposes, for formatting purposes, for authentication purposes, for authorization purposes, for permission purposes, for validity purposes, for security purposes, for completeness purposes, to identify potential errors, for malfeasance detection purposes, for duplication identification purposes, and the like. As such, supplemental or auxiliary systems may be accessed or utilized to compare resource elements or resource characters or components of the resource elements with information like account balances, user (e.g., payor, payee, intermediary, or the like) identities, malfeasance schemes, and the like. These processing steps may be identical for each resource field, may be identical for every resource field of the same resource type, or may be dependent on each resource field within the message (e.g., based on predetermined processing steps for each individual resource field of a matched message template), or the like.

This execution of the event associated with the slim message can automatically occur in real time, or near-real time, in direct response to the burdensome resource element being extracted from the first resource field (either before or after the burdensome resource element, or a copy of the burdensome resource element, is routed to the specialized resource element processing system 503). Additionally, one or more additional services may be provided by the general message processing system 501, an associated managing entity system (e.g., the managing entity system 200 of FIG. 1, a financial institution system, or the like), or the like. For example, a managing entity system may, in response to a transaction (i.e., the event) being executed, automatically transmit a notification to a point of sale computing device of a merchant associated with the transaction while a user that is also associated with the transaction is still at the point of sale device, and where the notification may include a confirmation that the transaction has been executed and any other transaction information (e.g., price, products sold, and the like) can be displayed via a user interface of the point of sale computing device. Similarly, the managing entity can transmit a notification directly to a computing device system (e.g., a personal computer or a mobile computing device) of a user associated with the event to provide confirmations and other information about the success of the executed event. In some embodiments, these additional communications from the managing entity system may include the message reference code and/or the burdensome resource element reference code.

Moving to block 512, the specialized resource element processing system 503 applies specialized resource processing steps to the burdensome resource element (or to a copy of the burdensome resource element). As noted above, the specialized resource element processing system 503 is not required to process the burdensome resource element at the same time as the general message processing system 501 processes the slim message. This allows the general message processing system 501 to perform its operations in real time, which is especially important for the execution of time-sensitive events like financial transactions.

Because the burdensome resource element is not necessary to be processed at the same time as the slim message (comprising the data and/or information that is actually needed for executing the event), the specialized resource element processing system 503 has some independence in how, when, or even if the burdensome resource element is processed. For example, the specialized resource element processing system 503 may store the burdensome resource element in a database until prompted (e.g., by a computing device system of a user associated with the message) for the burdensome resource element, deleting the burdensome resource element after a predetermined period of time (e.g., one day, one week, one month, one year, or the like) unless or until a prompt is received.

Alternatively, the specialized resource element processing system 503 may perform the specialized resource processing step referenced in block 512 without further prompting. This specialized resource element processing step may be performed automatically, in direct response to receiving the burdensome resource element, or may be performed at a later point in time (e.g., when processing requirements of the specialized resource element processing system 503 or the general message processing system 501 are at a reduced amount or below a predetermined threshold amount).

In some embodiments, the processing steps performed by the specialized resource element processing system 503 comprise resource-type processing that is specifically configured to efficiently processes a particular type of resource element, including burdensome resource elements of large resource size and/or or non-conventional resource types for message processing. As such, the specialized resource element processing system 503 may be configured to route the burdensome resource element to a particular sub-system that specializes in the same resource type as the burdensome resource system.

For example, the specialized resource element processing system 503 may identify the resource type (e.g., format type) of the burdensome resource element as comprising an Audio Video Interleave ("AVI") file, and therefore will route the burdensome resource element to a subsystem of the specialized resource element processing system 503 that is configured to efficiently process AVI files.

In other embodiments, the processing steps performed by the specialized resource element processing system 503 may be identical or nearly identical to the processing steps of the general message processing system 501, but the processing steps are not done at a time that will slow down the processing of the overall message (and therefore the execution of the event) or at a time that will slow down the processing of subsequent messages (and associated events). For example, the specialized resource element processing system 503 may run in parallel to the general message processing system 501, processing the burdensome resource element in the same manner as the message, as it is received without delaying or slowing down the processing of the message, even if it takes significantly more time to process the burdensome resource element than the slim message.

Alternatively, as described above, the specialized resource element processing system 503 may be configured to process the burdensome resource element in the same manner as the slim message, but only at a point in time when the processing resources of the computing devices (e.g., servers) associated with the specialized resource element processing system 503 or the general message processing system 501 are below a predetermined threshold, where the burden put on the specialized resource element processing system 503 is not significant enough to substantially slow down the processing of other messages.

Once the burdensome resource element has been successfully processed by the specialized resource element processing system 503, the specialized resource element processing system 503 may transmit the processed burdensome resource element back to the general message processing system 501, as shown at block 514. This communication may be conducted via a dedicated and secure communication channel, and may utilize data encryption or other data security measures to protect the data and/or information of the processed burdensome resource element throughout the transmission.

The general message processing system 501 may then be configured to receive the processed burdensome resource element from the specialized resource element processing system 503 and then aggregate the processed slim message with the processed burdensome resource element to generate a processed message, as shown at block 516. Aggregating the processed slim message with the burdensome resource element may comprise populating the first resource field of the slim message (i.e., the resource field that is in the same position as the first resource field the received message) with the processed burdensome resource element, thereby maintaining continuity of the original structure of the received message after processing. In other embodiments, aggregating the processed slim message with the burdensome resource element may comprise appending a new resource field to the message comprising the processed burdensome resource element. In other embodiments, the general message processing system 501 may generate a new message or notification that includes the processed burdensome resource element, and link the processed slim message with the new message or notification comprising the burdensome resource element such that these two messages can be transmitted together.

Finally, the process 500 may continue to block 518, where the general message processing system 501 transmits the processed message to a computing device of a user. As noted above, the computing device of the user may have already received a notification from the general message processing system 501 and/or a managing entity system that comprised an indication that the event was successfully executed (i.e., via the processing of the slim message). However, because the burdensome resource element likely has additional information associated with the event or the message in general, or may be required to be transferred to the computing device of the user as part of the message, the general message processing system 501 may be configured to transmit the processed message to the computing device of the user such that the user can access, open, or otherwise interact with the burdensome resource element.

Turning now to FIG. 6, an alternate embodiment of the invention is provided in the form of a flowchart that illustrates a process 600 for increasing processing efficiency through automated resource field transformation using a relational database system accessible by a user computing device system. The process 600 may involve a general message processing system 601, a burdensome resource element database system 603, and a user computing device system 605. The general message processing system 601 may be the same as, or substantially similar to the general message processing system 501 described with respect to FIG. 5.

The process 600 may begin with block 602, where the general message processing system 601 receives a message comprising a plurality of resource fields. The general message processing system 601 may then identify a burdensome resource element within a first resource field of the received message, as shown at block 604. Next, the general message processing system 601 may extract the burdensome resource element from the first resource field, as shown at block 606. Blocks 602, 604, and 606 may be identical to, or substantially the same as blocks 502, 504, and 506, respectively, described with respect to FIG. 5.

Once the burdensome resource element has been extracted from the first resource field, the process 600 may continue to block 608, where the general message processing system 601 routes the burdensome resource element to the burdensome resource element database system 603. The modes, methods, or other techniques of transmission of the burdensome resource element within this process 600 may be identical or substantially similar to those techniques described with respect to transmitting the burdensome resource element to the specialized resource element processing system 503, as described in block 508 of FIG. 5.

Once the burdensome resource element has been routed to the burdensome resource element database system 603, the general message processing system 601 may then automatically process a remaining slim message to execute an associated event, as noted at block 610. The execution of the event, via the processing of the slim message, in block 610 may be identical or substantially similar to the steps described with respect to block 510 of FIG. 5.

After the remaining slim message has been processed to execute the event, the general message processing system 601 may transmit the processed slim message and a burdensome resource element reference code to the user computing device system 605, as shown at block 612. In addition to the slim message and burdensome resource element, the general message processing system 601 may transmit a notification to the user computing device system to inform the user of a successful execution of the event associated with the message.

By providing the burdensome resource element reference code (which in some embodiments comprises the message reference code and/or a transaction identification code) to the user computing device system 605, this process 600 allows a user associated with the user computing device system 605 (e.g., a payee, a payor, or some other party to the message or the event of the message) to be able to understand that additional information from the message (i.e. the burdensome resource element) can be provided along with the slim message upon request or will be provided at a later point in time. The burdensome resource element reference code can subsequently be used by the user to request the burdensome resource element with a code that is specially configured to permit the burdensome resource element database system 603 to identify and/or provide the burdensome resource element to the user computing device system 605.

Turning now to block 616, once the burdensome resource element database system 603 has received the burdensome resource element that was routed to it, the burdensome resource element database system 603 may store the burdensome resource element in association with the burdensome resource element reference code. Again, the burdensome resource element reference code may comprise the message reference code and/or a transaction identification code associated with a transaction that is executed as part of the executed event of the message. In some embodiments, the burdensome resource element database system 603 comprises a relational database where a copy of the burdensome resource element can be stored with a link, association, pairing, or other relational connection to the burdensome resource element reference code. In this way, the burdensome resource element database system 603 is able to identify the burdensome resource element if given a search query input of the burdensome resource element reference code.

In other embodiments, the burdensome resource element database system comprises at least a portion of a blockchain network. In such embodiments, the burdensome resource element reference code may comprise a public blockchain key associated with a location where the copy of the burdensome resource element is stored within the blockchain network.

In some embodiments, the burdensome resource element database system 603 (or an associated specialized resource element processing system like the specialized resource element processing system 503 of FIG. 5) may perform one or more specialized processing steps on the burdensome resource element before the burdensome resource element is stored in the burdensome resource element database system 603 and/or at some point when the processing load is reduced. In other embodiments, the burdensome resource element database system 603 may store the burdensome resource element until the general message processing system 601 or a specialized resource element processing system (e.g. the specialized resource element processing system 503 of FIG. 5) is prepared to perform processing steps to the burdensome resource element.

Because the burdensome resource element is linked to the burdensome resource element reference code within the burdensome resource element database system 603, and because a user associated with the user computing device system 605 has access to the burdensome resource element reference code, the user can cause the user computing device system 605 to transmit the burdensome resource element reference code to the burdensome resource element database system 603 to request the burdensome resource element associated with the message, as noted at block 618. In some embodiments, a managing entity system may provide and/or instruct a messaging portal application that causes a user interface of the user computing device system 605 to display a search query field that can receive user input in the form of the burdensome resource element reference code.

As noted above, the burdensome resource element reference code can be identified by the user within the slim message (e.g., populated within the first resource field of the message). In other embodiments, the user may be able to access the slim message via the user computing device system 605 and select (e.g., click, copy/paste, or the like) the burdensome resource element reference code (e.g., a code or a link that represents the code), where selecting the burdensome resource element reference code causes the user computing device system 605 to automatically transmit the burdensome resource element reference code to the burdensome resource element database system 603.

The burdensome resource element database system 603 will then identify the burdensome resource element based on the received burdensome reference element reference code, as shown at block 620. This identification of the stored burdensome resource element may be executed by querying the relational database system in which the burdensome resource element is stored in association with the burdensome resource element reference code (e.g., the database is scanned for data, files, folders, or the like that are associated with the burdensome resource element reference code). In embodiments where the burdensome resource element reference code comprises a public blockchain key, the burdensome resource element database system 603 may enter the public blockchain key into an associated blockchain network portal to navigate to the public blockchain network address associated with the burdensome resource element reference code, where a copy of the burdensome resource element is stored.

Once identified, the burdensome resource element database system 603 can proceed to block 622 to transmit a copy of the burdensome resource element to the user computing device system 605. As noted above, this burdensome resource element may have already been processed (e.g., scanned for security purposes, scanned for completeness or accuracy, or the like) by a general or specialized processing system (which may be at least partially embodied by the burdensome resource element database system 603). In such embodiments, the burdensome resource element database system 603 may automatically and immediately transfer the copy of the burdensome resource element to the user computing device system 605.

In embodiments where the burdensome resource element has not been processed by a general or specialized system, the burdensome resource element database system 603 (or an associated specialized resource element processing system like the specialized resource element processing system 503 of FIG. 5) will perform one or more specialized processing steps to the burdensome resource element before transmitting the burdensome resource element to the user computing device system 605.

In yet other embodiments, the general message processing system 601 and/or the burdensome resource element database system 603 may determine based on metadata associated with the burdensome resource element (e.g., resource type, resource size, creator of the resource, or the like) that the burdensome resource element does not need to be processed prior to being transferred to the user computing device system 605. In particular, the burdensome resource element database system 603 may determine that the likelihood of transmitting a burdensome resource element with a particular malfeasance embedded within it (e.g., due to the resource type and the resource size) is below a predetermined threshold.

The user computing device system 605 will then receive the copy of the burdensome resource element from the burdensome resource element database system 603, as shown at block 624. In some embodiments, receiving the copy of the burdensome resource element (e.g., a processed burdensome resource element) comprises inserting the received burdensome resource element into the first resource field of the message that is already present on the user computing device system 605. In other embodiments, the burdensome resource element is received and stored separately from the message that it was initially a part of, but may be linked or otherwise associated with the message for subsequent resource querying purposes.

Referring now to FIG. 7, a flowchart is provided to illustrate one embodiment of a process 700 for increasing processing efficiency through automated resource field transformation, in accordance with embodiments of the invention. The system described with respect to the process 700 of FIG. 7 may encompass or embody at least a portion of the general message processing system 501 or the specialized resource element processing system 503 of FIG. 5. Additionally or alternatively, the system described with respect to the process 700 of FIG. 7 may encompass or embody at least a portion of one or more or the general message processing system 601, the burdensome resource element database system 603, and the user computing device system 605 of FIG. 6.

In some embodiments, the process 700 may include block 702, where the system receives a message comprising a plurality of resource fields, where the message is associated with a message reference code.

In some embodiments, the process 700 includes block 704, where the system identifies a first resource field of the plurality of resource fields that comprises a burdensome resource element. The first resource field may be identified by the system based on a determination that the burdensome resource element of the first resource field meets or surpasses a predetermined resource size threshold. Additionally or alternatively, the first resource field may be identified by the system based on a determination that the first resource field meets or comprises a predetermined resource format type.

Furthermore, the first resource field may be identified by the system based on a determination that the burdensome resource element of the first resource field meets or surpasses a predetermined resource size threshold for a specific resource format type that is associated with the burdensome resource element. In other embodiments, identifying the first resource field comprises identifying a message template associated with the received message. The system may then determine a position of a field of the message template that is associated with large resource sizes. The system can then identify the first resource field in the received message based on the position of the field of the message template that is associated with large resource sizes.

Additionally, in some embodiments, the process 700 includes block 706, where the system extracts the burdensome resource element from the first resource field of the message to generate a slim message. Extracting the burdensome resource element from the first resource field of the message may comprise or involve leaving the first resource filed empty once the burdensome resource element has been extracted, thereby significantly decreasing the size and processing requirements of the message as a whole.

Alternatively, in response to extracting the burdensome resource element from the first resource field, the system may populate the first resource field with a burdensome resource reference code and/or the message reference code.

The process 700 may also include block 708, where the system routes the extracted burdensome resource element to a burdensome resource processing system. The resource processing system may comprise a specialized processing system that is configured to efficiently process resource elements of the same resource type as the burdensome resource element. The specialized processing system may, in some embodiments, comprise or embody at least a portion of the specialized resource element processing system 503 of FIG. 5.

Routing the extracted burdensome resource element to a burdensome resource processing system may comprise storing the burdensome resource element in a relational database that associates the burdensome resource element with the message reference code or a burdensome resource reference code.

Finally, the process 700 may continue to block 710, where the system processes the slim message to execute an event associated with the message. In embodiments where the process 700 includes storing the burdensome resource element in a relational database that associates the burdensome resource element with the message reference code or a burdensome resource reference code, the system may subsequently receive, from a computing device of a user associated with the message, a request for the burdensome resource element, where the request comprises the message reference code or the burdensome resource reference code.

The system may then query the relational database with the message reference code or the burdensome reference code to identify the burdensome resource element within the relational database. The system may then copy the burdensome resource element from the relational database. Copying the burdensome resource element from the relational database may comprise extracting the burdensome resource element from the relational database and populating the first resource field of the processed slim message with the burdensome resource element. Additionally or alternatively, copying the burdensome resource element from the relational database may comprise extracting the burdensome resource element from the relational database and associating the burdensome resource element with a parameter of the first resource field. Ultimately, the system may be configured to transmit the burdensome resource element to the computing device of the user.

In embodiments where the system has populated the first resource field of the processed slim message with the burdensome resource element, the system may be configured to transmit the processed slim message, comprising the burdensome resource element populated in the first resource field of the processed slim message, to the computing device of the user.

In embodiments where the system has associated the burdensome resource element with a parameter of the first resource field, the system may be configured to transmit the parameter of the first resource field and the burdensome resource element to the computing device of the user.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for increasing processing efficiency through automated resource field transformation, the system comprising:
   a memory device; and
   a processing device operatively coupled to the memory device, wherein the processing device is configured to execute computer-readable program code to:
      receive a first message comprising a plurality of resource fields, wherein the first message is associated with a message reference code;
      identify a first resource field of the plurality of resource fields that comprises a burdensome resource element, wherein identifying the first resource field comprises:

identifying a message template associated with the received first message;
determining a position of a field of the message template that is associated with a largest resource size of the message template;
identifying the first resource field in the received first message based on the position of the field of the message template that is associated with the largest resource size of the message template;
determining a specific resource format type of a data file in the first resource field, wherein the data file in the first resource field is of a different resource format type from at least one other data file of other resource fields in the received first message; and
determining that the data file in the first resource field meets a predetermined resource size threshold for the specific resource format type;
extract the burdensome resource element from the first resource field of the first message to generate a slim message;
route the extracted burdensome resource element to a burdensome resource processing system by storing the burdensome resource element in a relational database that associates the burdensome resource element with the message reference code or a burdensome resource reference code, wherein the burdensome resource processing system comprises a specialized processing system configured to process resource elements of the same resource type as the burdensome resource element;
process the slim message to execute an event associated with the first message;
receive, from a computing device of a user associated with the first message, a request for the burdensome resource element, wherein the request comprises the message reference code or the burdensome resource reference code;
query the relational database with the message reference code or the burdensome resource reference code to identify the burdensome resource element within the relational database;
copy the burdensome resource element from the relational database; and
transmit the burdensome resource element to the computing device of the user.

2. The system of claim 1, wherein copying the burdensome resource element from the relational database comprises extracting the burdensome resource element from the relational database and populating the first resource field of the processed slim message with the burdensome resource element; and
wherein transmitting the burdensome resource element to the computing device of the user comprises transmitting the processed slim message, comprising the burdensome resource element populated in the first resource field of the processed slim message, to the computing device of the user.

3. The system of claim 1, wherein copying the burdensome resource element from the relational database comprises extracting the burdensome resource element from the relational database and associating the burdensome resource element with a parameter of the first resource field; and
wherein transmitting the burdensome resource element to the computing device of the user comprises transmitting the parameter of the first resource field and the burdensome resource element to the computing device of the user.

4. The system of claim 1, wherein extracting the burdensome resource element from the resource field comprises leaving the first resource field empty.

5. The system of claim 1, wherein the processing device is further configured to execute computer-readable program code to:
in response to extracting the burdensome resource element from the first resource field, populate the first resource field with a burdensome resource reference code.

6. A computer program product for increasing processing efficiency through automated resource field transformation, the computer program product comprising at least one non-transitory computer readable medium comprising computer readable instructions that are executed to cause the computer program product to:
receive a first message comprising a plurality of resource fields, wherein the first message is associated with a message reference code;
identify a first resource field of the plurality of resource fields that comprises a burdensome resource element, wherein identifying the first resource field comprises:
identifying a message template associated with the received first message;
determining a position of a field of the message template that is associated with a largest resource size of the message template;
identifying the first resource field in the received first message based on the position of the field of the message template that is associated with the largest resource size of the message template;
determining a specific resource format type of a data file in the first resource field, wherein the data file in the first resource field is of a different resource format type from at least one other data file of other resource fields in the received first message; and
determining that the data file in the first resource field meets a predetermined resource size threshold for the specific resource format type;
extract the burdensome resource element from the first resource field of the first message to generate a slim message;
route the extracted burdensome resource element to a burdensome resource processing system by storing the burdensome resource element in a relational database that associates the burdensome resource element with the message reference code or a burdensome resource reference code, wherein the burdensome resource processing system comprises a specialized processing system configured to process resource elements of the same resource type as the burdensome resource element;
process the slim message to execute an event associated with the first message;
receive, from a computing device of a user associated with the first message, a request for the burdensome resource element, wherein the request comprises the message reference code or the burdensome resource reference code;
query the relational database with the message reference code or the burdensome resource reference code to identify the burdensome resource element within the relational database;

copy the burdensome resource element from the relational database; and transmit the burdensome resource element to the computing device of the user.

7. The computer program product of claim 6, wherein copying the burdensome resource element from the relational database comprises extracting the burdensome resource element from the relational database and populating the first resource field of the processed slim message with the burdensome resource element; and wherein transmitting the burdensome resource element to the computing device of the user comprises transmitting the processed slim message, comprising the burdensome resource element populated in the first resource field of the processed slim message, to the computing device of the user.

8. The computer program product of claim 6, wherein copying the burdensome resource element from the relational database comprises extracting the burdensome resource element from the relational database and associating the burdensome resource element with a parameter of the first resource field; and wherein transmitting the burdensome resource element to the computing device of the user comprises transmitting the parameter of the first resource field and the burdensome resource element to the computing device of the user.

9. The computer program product of claim 6, wherein the computer readable instructions further comprise instructions that are executed to cause the computer program product to:

in response to extracting the burdensome resource element from the first resource field, populate the first resource field with a burdensome resource reference code.

10. A computer implemented method for increasing processing efficiency through automated resource field transformation, said computer implemented method comprising:

providing a computing system comprising a computer processing device and a non-transitory computer readable medium, where the computer readable medium comprises configured computer program instruction code, such that when said instruction code is operated by said computer processing device, said computer processing device performs the following operations:

receiving a first message comprising a plurality of resource fields, wherein the first message is associated with a message reference code;

identifying a first resource field of the plurality of resource fields that comprises a burdensome resource element, wherein identifying the first resource field comprises:

identifying a message template associated with the received first message;

determining a position of a field of the message template that is associated with a largest resource size of the message template;

identifying the first resource field in the received first message based on the position of the field of the message template that is associated with the largest resource size of the message template;

determining a specific resource format type of a data file in the first resource field, wherein the data file in the first resource field is of a different resource format type from at least one other data file of other resource fields in the received first message; and determining that the data file in the first resource field meets a predetermined resource size threshold for the specific resource format type;

extracting the burdensome resource element from the first resource field of the first message to generate a slim message;

routing the extracted burdensome resource element to a burdensome resource processing system by storing the burdensome resource element in a relational database that associates the burdensome resource element with the message reference code or a burdensome resource reference code, wherein the burdensome resource processing system comprises a specialized processing system configured to process resource elements of the same resource type as the burdensome resource element;

processing the slim message to execute an event associated with the first message receiving, from a computing device of a user associated with the first message, a request for the burdensome resource element, wherein the request comprises the message reference code or the burdensome resource reference code;

querying the relational database with the message reference code or the burdensome resource reference code to identify the burdensome resource element within the relational database;

copying the burdensome resource element from the relational database; and transmitting the burdensome resource element to the computing device of the user.

11. The computer implemented method of claim 10, wherein copying the burdensome resource element from the relational database comprises extracting the burdensome resource element from the relational database and populating the first resource field of the processed slim message with the burdensome resource element; and wherein transmitting the burdensome resource element to the computing device of the user comprises transmitting the processed slim message, comprising the burdensome resource element populated in the first resource field of the processed slim message, to the computing device of the user.

12. The computer implemented method of claim 10, wherein copying the burdensome resource element from the relational database comprises extracting the burdensome resource element from the relational database and associating the burdensome resource element with a parameter of the first resource field; and wherein transmitting the burdensome resource element to the computing device of the user comprises transmitting the parameter of the first resource field and the burdensome resource element to the computing device of the user.

13. The computer program product of claim 6, wherein extracting the burdensome resource element from the resource field comprises leaving the first resource field empty.

14. The computer implemented method of claim 10, wherein extracting the burdensome resource element from the resource field comprises leaving the first resource field empty.

15. The computer implemented method of claim 10, further comprising, in response to extracting the burdensome resource element from the first resource field, populating the first resource field with a burdensome resource reference code.

\* \* \* \* \*